United States Patent Office 3,547,825
Patented Dec. 15, 1970

3,547,825
CRYSTALLINE PYROPHOSPHORIC ACID COMPOSITION
Chung Yu Shen, St. Louis, Mo., assignor to Monsanto Company, St. Louis, Mo., a corporation of Delaware
No Drawing. Original application Mar. 24, 1965, Ser. No. 442,501, now Patent No. 3,371,992, dated Mar. 5, 1968. Divided and this application Sept. 27, 1967, Ser. No. 680,285
Int. Cl. C09d 9/04; C11d 7/50; C23g 5/02
U.S. Cl. 252—172
9 Claims

ABSTRACT OF THE DISCLOSURE

Crystalline pyrophosphoric acid is formed by adding crystals of same to a dispersion of liquid polyphosphoric acid (78–82% $P_2O_5$) in a non-aqueous solvent. The temperature of this dispersion is then maintained at below the melting point of crystalline pyrophosphoric acid until conversion to the crystalline form is complete.

RELATED APPLICATIONS

This application is a divisional of application S.N. 442,501, filed Mar. 24, 1965, now U.S. Pat. 3,371,992, patented Mar. 5, 1968.

The present invention relates to the manufacture of crystalline polyphosphosic acid. More specifically, the present invention relates to processes for manufacturing particulated, crystalline pyrophosphoric acid and to certain products resulting therefrom.

While crystalline pyrophosphoric acid ($H_4P_2O_7$) is a specific, readily identifiable, chemical compound having a $P_2O_5$ content of 79.76%, the material that is most commonly referred to as "pyrophosphoric acid" is a viscous, sticky liquid having a $P_2O_5$ content of from about 78 to about 82%, which liquid actually contains a mixture of specific phosphoric acids ranging from orthophosphoric acid through pyrophosphoric acid, tripolyphosphoric acid, tetrapolyphosphoric acid, etc. Because of the very nature of the material, wherever a $P_2O_5$-$H_2O$ composition having a $P_2O_5$ content above about 70 weight percent is in the liquid state, it is invariably a mixture of acids; the particular identity of the mixture depending largely upon the $P_2O_5$ content of the "poly-acid" material. Thus, the liquid polyphosphoric acid commonly referred to as "pyrophosphoric acid" (having a $P_2O_5$ content of about 80 weight percent) usually contains about 17 weight percent of orthophosphoric acid ($H_3PO_4$), about 42 weight percent of pyrophosphoric acid ($H_4P_2O_7$), about 25 weight percent of tripolyphosphoric acid ($H_5P_3O_{10}$), about 10 weight percent of tetrapolyphosphoric acid ($H_6P_4O_{13}$), and a total of about 6 weight percent of higher chain length polyphosphoric acids.

The liquid polyphosphoric acids (including liquid "pyrophosphoric acid") are most economically manufactured by reacting $P_2O_5$ with water, the particular amount of water used depending upon the particular polyphosphoric acid desired. Because of the potential economic advantage (over other processes for making pyrophosphates such as dicalcium pyrophosphate and tetrasodium pyrophosphate) that reacting $P_2O_5$ with water and subsequently "neutralizing" the resulting "pyrophosphoric acid" with an appropriate base has to offer, attempts have been made heretofore to utilize liquid "pyrophosphoric acid" as a raw material in the manufacture of various useful pyrophosphate salts. Such attempts have generally failed due to the fact that liquid "pyrophosphoric acid" is a mixture of acids. "Neutralization" of these acids with bases simply yielded products that were also mixtures of various salts of ortho- and poly-phosphoric acid, rather than the desired relatively pure pyrophosphates. Various attempts have also been made heretofore to prepare crystalline pyrophosphoric acid, which might in turn be used in the manufacture of relatively pure pyrophosphates, but such attempts have been generally unsuccessful, because first of all, it took at least several days or weeks to prepare the crystalline material, and secondly, the resulting product was extremely hygroscopic, very sticky and lumpy, and therefore difficult to handle.

It is an object of the present invention to provide novel processes for manufacturing crystalline pyrophosphoric acid from liquid polyphosphoric acid.

It is another object of the present invention to provide novel processes for manufacturing crystalline pyrophosphoric acid in a fairly uniform particulated form from liquid "pyrophosphoric acid."

It is still another object of this invention to provide processes for manufacturing crystalline pyrophosphoric acid from liquid "pyrophosphoric acid" in a fraction of the amount of processing time heretofore believed necessary to do so.

It is still another object of the present invention to provide novel compositions containing mainly crystalline pyrophosphoric acid, which compositions are free flowing and are relatively less hygroscopic than crystalline pyrophosphoric acid compositions manufactured heretofore.

These objects, as well as others that will become apparent from the following description and claims, can be accomplished by (a) dispersing an appropriate liquid polyphosphoric acid (in the form of a suspension) in a non-aqueous solvent, (b) intermixing with the resulting suspension an amount of finely divided crystals of pyrophosphoric acid, and (c) maintaining the temperature of the resulting "seeded" suspension below that at which the crystals of pyrophosphoric acid melt until the liquid polyphosphoric acid has been converted to the crystalline form. The resulting dispersion (of crystalline pyrophosphoric acid in non-aqueous solvent) can be used subsequently in the form of a dispersion, per se, or the resulting particles of crystalline pyrophosphoric acid can be separated from all or part of the solvent, whichever is desired. The unexpectedly valuable particulated crystalline pyrophosphoric acid compositions of the present invention contain particulated crystalline pyrophosphoric acid, essentially no liquid "pyrophosphoric acid," and a quantity of non-aqueous solvent having a relatively high vapor pressure at room temperature.

The liquid polyphosphoric acids that can be used in the successful practice of the present invention are those having a $P_2O_5$ content within the range of from about 78 to about 82 weight percent. It is preferred, however, that liquid "pyrophosphoric acid" containing from about 79 to about 81 weight percent of $P_2O_5$ be utilized. For optimum results, that having a $P_2O_5$ content of approximately 79.8 weight percent should be used.

Any non-aqueous, non-reactive solvent that is sufficiently fluid at temperatures below about 70° C. [to serve as the fluid continuous phase into which can be emulsified or dispersed any of the aforementioned liquid polyphosphoric acids (using conventional, relatively high speed mixing equipment)] can be used in the practice of the present invention. The solvent must be "non-reactive" with respect to the polyphosphoric acid to be dispersed therein. That is, it must be of a type that will not react extensively with either liquid or crystalline polyphosphoric acids when such acids are dispersed therein at temperatures below about 70° C. It is also preferred that the viscosity of the non-aqueous solvent (measured at 25° C.) be at most about two poises, and that its boiling point be below about 150° C. Still further preferred are those solvents in this class that have boiling points (under atmosphere) below about 70° C. Typical, but non-limiting examples of the types of solvents intended to be encompassed by the term "non-aqueous solvent" in the present disclosure and claims include halogenated hydrocarbons, such as trichloroethane, chloroform, carbontetrachloride, fluorotrichloroethylene, perchloroethylene, and the like; and aromatic or aliphatic hydrocarbon compounds, such as benzene, Stoddard's solvent, toluene, cyclohexane, hexane, and the like. In general the non-aqueous solvents useful in the practice of the present invention do not react with or dissolve the pyrophosphoric acid under prolonged storage at temperatures below about 70° C.

Regarding the successful practice of the processes of the present invention, preferred non-aqueous solvents are those having boiling points (under 1 atmosphere) lower than the melting point of the particular crystalline pyrophosphoric acid used and/or manufactured in such processes. Thus, when Form I crystalline pyrophosphoric acid is to be manufactured via the process, the boiling point of the non-aqueous solvent should preferably be at most about 54° C., and when Form II crystalline pyrophosphoric acid is to be made, the boiling point of the non-aqueous solvent should preferably be at most about 71° C. The boiling points of any given non-aqueous solvent (or mixture of non-aqueous solvents) can readily be ascertained either by a simple measurement or from readily available chemical and/or physical tables. Therefore, the preferred types of solvents falling within these temperature limitations need not be detailed here.

While the actual size of the "seed" crystals of pyrophosphoric acid used in the successful practice of the present invention is not critical, generally fine results can be obtained when at least about 80 weight percent thereof can be passed through a U.S. Standard 10 mesh screen. Preferably, the "seed" crystals should be very fine; that is, they should be sufficiently small so that at least 80 weight percent of them can be passed through a U.S. Standard 16 mesh screen. Especially good results can be obtained, for example, when the number average particle size (diameter) of the "seed" crystal of pyrophosphoric acid (intermixed into the suspension of liquid "pyrophosphoric acid" in accordance with the above-described processes) is below about 2 millimeters.

In the following examples, which represent some of the preferred embodiments of the present invention, all parts given are by weight unless otherwise specified.

EXAMPLE I

Into a conventional glass lined insulated reaction vessel fitted with a fairly efficient stirrer and cooling jacket are placed 400 parts of carbon tetrachloride and 100 parts of liquid "pyrophosphoric acid" (having a $P_2O_5$ content of 79.8 weight percent). The mixture is then agitated vigorously for 10 minutes in order to obtain a uniform suspension of droplets of the liquid "pyrophosphoric acid" in the non-aqueous solvent ($CCl_4$). At this point the temperature of the emulsion is 30° C. While the suspension is being stirred continuously, 100 parts of finely divided (100% of −10 mesh) crystalline Form I pyrophosphoric acid are poured into the reaction vessel over a period of 2 minutes. During the next 30 minutes, the temperature of the emulsion increases gradually to about 35° C. due to heat evolved by the acid when it is crystallized.

After only about 80 minutes have passed since the pyrophosphoric acid "seed" crystals were poured into the suspension, the stirrer is stopped. The dispersed phase (subsequently found to be practically pure Form I crystalline pyrophosphoric acid) immediately settles to the bottom of the reaction vessel, and 200 parts of the $CCl_4$ solvent are withdrawn by decantation. The material remaining in the vessel after the decantation step is then subjected to a filtration step in which an additional 100 parts of $CCl_4$ are separated from the pyrophosphoric acid crystals. The resulting material (containing 67 weight percent of particulated pyrophosphoric acid, the particles of which are small enough to pass through a 60 mesh U.S. Standard screen and 33 weight percent of carbon tetrachloride) is split into two fractions, labeled fraction "A" and fraction "B." Fraction "A" is then subjected to a vacuum drying operation in which all of the carbon tetrachloride is evaporated from the mixture at a temperature of about 30° C. The resulting material remains particulated and free-flowing so long as the container in which the acid crystals are stored remains tightly sealed. However, if the container is opened and the contents thereof are exposed to ambient air (containing the usual small amount of moisture), the acid crystals begin to stick together due to their absorption of moisture from the air. By comparison, fraction "B" in which some of the carbon tetrachloride is permitted to remain, resists humid air even after fairly prolonged exposure thereto (for example, by periodically opening the container containing fraction "B," or by transferring the fraction "B" material from one container to another under ambient conditions), and practically no lumping or loss of flowability of the acid particles is observed so long as a significant amount of the carbon tetrachloride remains in the mixture. In addition, the presence of the $CCl_4$ in fraction "B" apparently contributes to the "fluidity" of fraction "B," since fraction "B" is more freely flowing than is fraction "A" (after the $CCl_4$ has been removed from fraction "A").

Benefits such as those described in Example I above (regarding the ease and speed of making crystalline pyrophosphoric acid) can be obtained no matter which of the "non-aqueous, non-reactive solvents" (detailed hereinbefore) is utilized. Similarly, any of the liquid superphosphoric acids described above can be used as in Example I. When Form II crystalline pyrophosphoric acid is the desired product, seeds of Form II material must be used (in place of the Form I seeds of Example I).

The advantages (regarding the improved flowability and improved reduced hygroscopicity of crystalline pyrophosphoric acid in the presence of an effective amount of certain of the above-described non-aqueous, non-reactive solvents") can be obtained with any of the above-described solvents (or mixtures thereof) that has a vapor pressure at 25° C. of at least about 20 mm. Hg (but below 700 mm. Hg). The resulting mixtures, containing from about 5 to about 95 weight percent (and preferably from about 20 to about 90 weight percent) of particulated crystalline, free flowing pyrophosphoric acid (of either crystalline "form" or mixtures thereof) and from about 95 to about 5 weight percent (and preferably from about 80 to about 10 weight percent) of one (or a mixture) of such relatively volatile solvents are preferred embodiments of the present invention. Since these preferred (compositions) embodiments of the present invention will ordinarily be handled and used at temperatures within the range of from about −10° C. to about 70° C., it is preferred that the relatively volatile non-aqueous solvent(s) in these compositions be liquid (under "normal" conditions of about 1 atmosphere of pressure) within this temperature range. Thus, preferred relatively volatile, non-reactive (with pyrophosphoric acid) solvents for use in this particular (composition) aspect of the present invention include but are not limited to, such solvents as $CCl_4$, $CHCl_5$, $CHBr_3$, $CH_2Cl_2$, $CH_2Br_2$, $Cl_3CF$, $CHFCl_2$, $CHClBr_2$, $CHFClBr$, $C_2Cl_6$, $C_2Cl_4$, $C_2HCl_3$, $C_2H_3Cl_3$, $C_2H_4Cl_2$, $C_2H_5Cl$, $C_2F_2Cl_2$, $C_2F_2Cl_4$, $C_2HFCl_4$, $C_2H_2FCl_3$, $C_2H_3F_2Br$, $C_2H_3F_2Cl$, $C_3H_3Cl$, $C_3H_3Br$, $C_3H_4Cl$, $C_3H_5Cl$, $C_3H_4Cl_2$, $C_3H_6Cl_2$, $C_4H_7Cl$, $C_4H_5Cl_2$, $C_4H_9F$, $C_4H_9Cl$, $C_5H_{12}$, $C_5H_{11}Cl$, $C_6H_6$, $C_6H_{10}$, $C_6H_{12}$, $C_6H_{14}$, and the like. Of these particularly preferred non-volatile solvents are carbon tetrachloride perchloroethylene, ethylene dichloride, chloroform, methylchloroform, hexane, cyclohexane, and benzene.

Typical examples of some of the preferred free-flowing mixtures of crystalline pyrophosphoric acid and non-volatile solvent(s) of the present invention include (but are not limited to);

(a) 50 weight percent of Form I pyrophosphoric acid and 50 weight percent of carbon tetrachloride.

(b) 75 weight percent of Form I pyrophosphoric acid and 25 weight percent of trichloroethane.

(c) 80 weight percent of Form II pyrophosphoric acid and 20 weight percent of chloroform.

(d) 80 weight percent of Form II pyrophosphoric acid and 20 weight percent of trichloroethylene.

(e) 60 weight percent of Form I pyrophosphoric acid and 40 weight percent of benzene.

(f) 10 weight percent of Form II pyrophosphoric acid and 90 weight percent of ethylidene dichloride.

(g) 10 weight percent of Form II pyrophosphoric acid and 90 weight percent of carbon tetrachloride.

(h) 50 weight percent of Form II pyrophosphoric acid and 50 weight percent of hexane.

(i) 75 weight percent of Form I pyrophosphoric acid and 25 weight percent of heptane.

(j) 95 weight percent of Form II pyrophosphoric acid and 5 weight percent of trichlorofluoromethane.

(k) 60 weight percent of Form II pyrophosphoric acid, 37 weight percent of Form I pyrophosphoric acid, and 3 weight percent of pentane.

(l) 50 weight percent of Form II pyrophosphoric acid and 50 weight percent of a mixture containing 60 parts of toluene and 40 parts of xylene.

(m) 75 weight percent of Form II pyrophosphoric acid and 25 percent of a mixture of a hydrocarbon fraction equivalent to a common gasoline.

(n) 80 weight percent of Form II pyrophosphoric acid and 15 percent of a mixture of a hydrocarbon fraction equivalent to a common kerosene and 5 percent of a mixture equivalent to gasoline.

(o) 90 weight percent of Form II pyrophosphoric acid and 10 percent of a mixture of a chlorinated hydrocarbon fraction with an initial boiling point of 30–50° C. and 95 percent boiling point of about 120–150° C.

All of the above-identified mixtures are free-flowing slurries or solids, can be stored for prolonged times at temperatures up to (but not including) that at which the pyrophosphoric acid fraction melts without excessive loss of their flowability, and are more resistant than pure pyrophosphoric acid to atmospheric moisture when they are subjected to it.

Generally, in order to have the most desirable, free-flowing characteristics, the mixtures (of crystalline, solid pyrophosphoric acid and non-aqueous solvent detailed hereinbefore) should be finely divided in form. Thus most of the particles of pyrophosphoric acid in the mixtures should be sufficiently small so that at least about 80 weight percent thereof can be passed through a U.S. Standard 10 mesh screen (i.e., their diameter should average below about 2 millimeters). Preferably, 80 weight percent of the particles of pyrophosphoric acid in such mixtures should be small enough to pass through a U.S. Standard 16 mesh screen.

What is claimed is:

1. A particulated, free-flowing composition consisting essentially of from about 5 to about 95 weight percent of pyrophosphoric acid crystals and from about 95 to about 5 weight percent of a non-aqueous hydrocarbon solvent or a non-aqueous halogenated hydrocarbon solvent having a boiling point below about 150° C. and a vapor pressure at 25° C. between about 20 and about 700 mm. of mercury said crystalline pyrophosphoric acid being prepared by a process comprising forming a seeded suspension by dispersing finely divided pyrophosphoric acid crystals into a first suspension containing in the dispersed phase liquid polyphosphoric acid having a $P_2O_5$ content of from about 78 to about 82 weight percent, maintaining the temperature of the resulting seeded suspension below the melting point of said pyrophosphoric acid crystals until said liquid polyphosphoric acid has been converted to crystalline pyrophosphoric acid and recovering said crystalline pyrophosphoric acid, the continuous phase of said first suspension being said non-aqueous solvent.

2. A composition as in claim 1, wherein said solvent is selected from the group consisting of halogenated hydrocarbons, aliphatic hydrocarbons and aromatic hydrocarbons, and at least about 80 weight percent of said pyrophosphoric acid crystals are small enough to pass through a U.S. Standard 10 mesh screen.

3. A composition as in claim 2, wherein said non-aqueous solvent is carbon tetrachloride.

4. A composition as in claim 2, wherein said non-aqueous solvent is perchloroethylene.

5. A composition as in claim 2, wherein said non-aqueous solvent is ethylene dichloride.

6. A composition as in claim 2, wherein said non-aqueous solvent is chloroform.

7. A composition as in claim 2, wherein said non-aqueous solvent is hexane.

8. A composition as in claim 2, wherein said non-aqueous solvent is benzene.

9. A composition as in claim 2, wherein said non-aqueous solvent is cyclohexane.

References Cited
UNITED STATES PATENTS

| | | | |
|---|---|---|---|
| 2,940,938 | 6/1960 | Blinka | 252—139 |
| 3,093,952 | 6/1963 | Porcaro | 252—172 |
| 3,373,115 | 3/1968 | Stebban | 252—172 |
| 3,399,145 | 8/1968 | Martinek et al. | 252—172 |

LEON D. ROSDOL, Primary Examiner

W. E. SCHULZ, Assistant Examiner

U.S. Cl. X.R.

23—165; 252—139, 143

PO-1050
(5/69)

UNITED STATES PATENT OFFICE
CERTIFICATE OF CORRECTION

Patent No.  3,547,825                Dated  December 15, 1970

Inventor(s)  Chung Yu Shen

It is certified that error appears in the above-identified patent and that said Letters Patent are hereby corrected as shown below:

Column 4, line 64, "$CHCl_5$" should read -- $CHCl_3$ --; line 68, "$C_4H_5Cl_2$" should read -- $C_4H_8Cl_2$ --; line 69, after "$C_6H_6$" and before "$C_6H_{10}$" should be inserted -- $C_6H_8$ --.

Signed and sealed this 30th day of May 1972.

(SEAL)
Attest:

EDWARD M. FLETCHER, JR.
Attesting Officer

ROBERT GOTTSCHALK
Commissioner of Patents